United States Patent
Baldwin

(10) Patent No.: US 11,507,646 B1
(45) Date of Patent: Nov. 22, 2022

(54) USER AUTHENTICATION USING VIDEO ANALYSIS

(71) Applicant: Amazon Technologies, Inc., Seattle, WA (US)

(72) Inventor: Leo Benedict Baldwin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 355 days.

(21) Appl. No.: 15/720,580

(22) Filed: Sep. 29, 2017

(51) Int. Cl.
    *G06F 21/00*     (2013.01)
    *G06F 21/32*     (2013.01)
    *H04L 9/32*     (2006.01)
    *G06F 21/30*     (2013.01)
    *G06F 21/31*     (2013.01)
    *G06V 40/16*     (2022.01)

(52) U.S. Cl.
    CPC ............. *G06F 21/32* (2013.01); *G06F 21/30* (2013.01); *G06F 21/31* (2013.01); *G06V 40/166* (2022.01); *G06V 40/172* (2022.01); *H04L 9/3231* (2013.01)

(58) Field of Classification Search
CPC ........ G06F 21/30; G06F 21/31; G06F 21/316; G06F 21/32; G06F 21/34; G06F 21/45; G06F 21/46; G06F 21/36
See application file for complete search history.

(56) References Cited

U.S. PATENT DOCUMENTS

| | | | |
|---|---|---|---|
| 9,251,401 B1* | 2/2016 | Koo ................... | G06K 9/00288 |
| 2008/0192980 A1* | 8/2008 | Park ................... | G06K 9/00221 |
| | | | 382/103 |
| 2013/0188840 A1* | 7/2013 | Ma ..................... | G06K 9/00221 |
| | | | 382/107 |
| 2015/0086108 A1* | 3/2015 | Craig .................... | G06F 21/32 |
| | | | 382/154 |
| 2015/0227774 A1* | 8/2015 | Balch ................. | G06K 9/00033 |
| | | | 382/124 |
| 2016/0148066 A1* | 5/2016 | Duenias ............... | H04N 5/2357 |
| | | | 382/115 |
| 2018/0012059 A1* | 1/2018 | Gacon .................... | G06V 40/45 |
| 2019/0026544 A1* | 1/2019 | Hua ........................ | G06T 7/194 |

* cited by examiner

*Primary Examiner* — Edward Zee
(74) *Attorney, Agent, or Firm* — Lee & Hayes, P.C.

(57) ABSTRACT

A user may be authenticated at a device through analyzing video frames of acquired video data. Feature recognition may be used to determine that features in the video frames correspond to features of an authorized user. Moreover, successive frames of the video frames may be compared to determine whether the video data is representative of a video capturing the user, or a representation of the user, such as a digital image of or a video depicting the user.

21 Claims, 8 Drawing Sheets

USER AUTHENTICATION USING VIDEO ANALYSIS

BACKGROUND

Electronic devices are ubiquitous. As the world has gone online and into the cloud, electronic devices are increasingly utilized to store and share sensitive and/or confidential information. To protect information, electronic devices often require varied levels of authentication to interact with the device. For example, a user may need to be authenticated to unlock the device, to access applications or content on the electronic device, to complete transactions with the electronic device, and the like. One conventional approach to authenticate a user includes requiring entry of a password or a passcode. Moreover, in addition to or instead of password/passcode entry, biometric authentication has also become more prevalent. Biometric authentication may include facial recognition, fingerprint scanning, and/or retinal scanning, for example.

While biometric authentication may provide enhanced security relative to passwords or passcodes, biometric authentication is still susceptible to certain types of nefarious actions.

BRIEF DESCRIPTION OF THE DRAWINGS

The detailed description is described with reference to the accompanying figures.

DETAILED DESCRIPTION

Figure 1A:
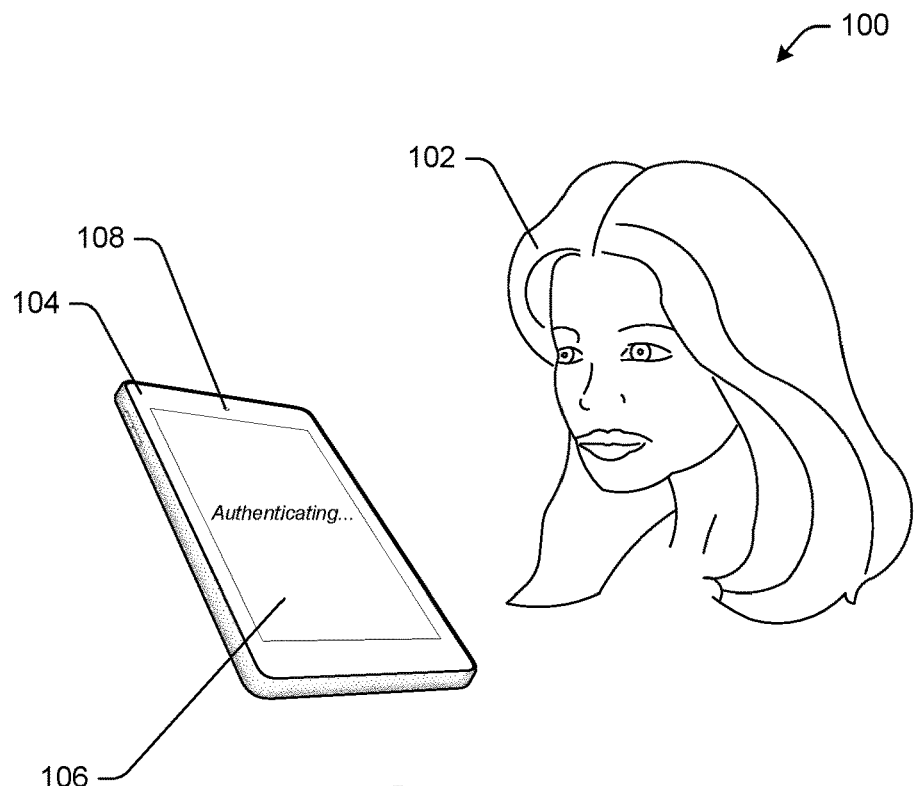
FIG. 1A is a perspective view of an example of a user attempting to access an electronic device according to an example implementation of this disclosure.

Example systems and methods are described herein that may overcome one or more of shortcomings and/or other deficiencies associated with conventional approaches to biometric identification and/or authentication of a user at a computing device. In example implementations, systems and methods described herein may distinguish between an actual person requesting authentication on an electronic device and a representation, e.g. a photo or video of the person.

As noted above, biometric authentication techniques, such as facial recognition, may provide an alternative to password entry on electronic devices. Generally, facial (or other feature) recognition techniques isolate or extract features in an image. The extracted features are then compared to stored features associated with an authorized user, and upon determining a match between the extracted features and the stored features, the authorized user is authenticated. However, facial recognition techniques are also susceptible to unauthorized attempts at authentication. For example, biometric authentication techniques that capture an image to perform facial or other recognition may be susceptible to "spoofing." In spoofing, an unauthorized user may present a photo or digital representation of an authorized user for biometric authentication, e.g., by holding the photo or digital representation in the field of view of a camera of the device. An image of the photo or of the digital representation may be indistinguishable from an image of the authorized user, and thus facial features extracted from the video data captured by the camera may sufficiently match features associated with the authorized user. In this instance, the facial recognition may determine that the authorized user is in the field of view of the camera, and authentication is successful because of the spoofing.

In accordance with various aspects of this disclosure, authentication approaches discussed herein may enable the computing device to combat this type of spoofing attack by analyzing a video data to determine whether captured video is of a physical representation, such as playback on a display screen, or of an actual person. For example, according to implementations of this disclosure, authentication may be achieved upon determining that video captured by the camera is of an actual person and authentication may be denied upon determining that the video captured by the camera is of a physical representation.

In example authentication techniques described herein, video frames comprising a video data captured by a camera may be analyzed for similarities. For instance, successive or consecutive video frames may be compared to determine whether the compared frames have a threshold level of similarity. Successive frames are unlikely to exhibit the threshold level of similarity when they are images of an actual person, because one or more attributes of the person are constantly changing, whether voluntarily or involuntarily, and those changes are detectible. In contrast, successive frames may exhibit the threshold level of similarity when they are images of a physical representation. Comparison of successive frames may be conducted using software techniques, such as using correlation techniques. Correlation may be done in the color space, the intensity space, or the physical space, for example. In other implementations, comparison of successive frames may be conducted by determining motion vectors for the frames and analyzing the motion vectors. For example, if the video data is compressed, e.g., using a video encoder, the motion vectors or a vector field associated with the discrete frames in the video data that are created as part of the compression may be used to detect relative motion of different parts of the frame.

In some example implementations, successive frames of video data of a physical representation of a user, not of the actual user, may be substantially similar, or even identical, because the camera may be configured to capture frames comprising the video data at a frame rate higher than a display rate of conventional display rates. For example, a display device used to play a video of an authorized user in an attempt to spoof facial recognition safeguards, plays that video at a display rate. If the camera capturing a video of the display of the display device has a faster frame rate than the display rate of the display, however, some frames in the video stream may be captured twice (or more) by the camera. For instance, in an example in which the display device used in an attempt to spoof the facial recognition techniques has a display rate of 30 frames per second and the camera associated with the facial recognition processing has a frame rate of 60 frames per second, each frame of the video playback on the display device is captured twice. In contrast, as noted above, in instances in which video of an actual user is being captured, there is no duplication of frames.

In some implementations, the frame rate of the camera may be variable. For instance, the camera may be configurable between several different frame rates. According to examples of this disclosure, the camera may be controlled to record the video data used for authentication at a relatively faster frame rate, e.g., the highest possible frame rate. In still other examples, the frame rate of the camera may be dynamically adjusted, e.g., to better ensure that spoofing techniques are discovered by capturing successive frames having substantial similarities.

Although the foregoing examples and other examples throughout this specification may be described in the context of facial recognition techniques, this disclosure is not limited to these techniques. For example, aspects of this disclosure may be useful to detect spoofing attacks targeting other feature recognition techniques not tied to the face. Aspects of this disclosure may be useful to counter spoofing attacks that may target any type of recognition system that relies on capturing an image or video and comparing the image/video to authenticated images or features.

The techniques, devices, and systems described herein may be implemented in a number of ways. Example implementations are provided below with reference to the following figures.

FIG. 1A illustrates an exemplary environment 100 in which a user 102 is attempting to gain access to a computing device 104. The illustrated computing device 104 includes a display 106 and a camera 108. The camera 108 is operable to capture image information over a field of view on a side of the computing device 104 proximate the display 106. The display 106 may be operable to prompt a user. For example, the display 106 may prompt the user to look at the camera 108 while the computing device 104 performs facial recognition to authenticate the user 102.

The computing device 104 is generally illustrated as a portable computing device, such as a smart phone, electronic book reader, a tablet computer, or the like. However, in other embodiments, the computing device 104 may be any number of electronic devices. Some example devices include, but are not limited to, desktop computers, notebook computers, gaming consoles, wearable computing devices, and portable media players. Generally, the computing device 104 may be any device to which access may be granted using biometric authentication techniques such as those described herein. By way of non-limiting example, the computing device 104 may be associated with security systems that authenticate users for entry into restricted areas and/or with security systems that authenticate users to access information, data, content, or the like.

In an illustrative embodiment of FIG. 1A, the camera 108 is positioned such that the user 102 is likely to be at least partially included in the field of view when the person is interacting with the device, such as by looking and/or otherwise interacting with the display 108 of the device. In the illustrated embodiment, the camera 108 is a front-facing camera. In other embodiments, the device 104 may include additional or alternative cameras configured to capture video, and information from all of the cameras can be analyzed, as appropriate. For example, in embodiments discussed below, a user may be authenticated at the device by performing facial recognition on images captured by the camera 108. Moreover, video of the user 102 may be analyzed to ensure that the images used for facial recognition are, in fact, images of the user and not of a physical representation of the user. These and other analyses may be done using only video captured by the camera 108 or images/video captured by separate cameras may be used for different of the analyses. For instance, while certain aspects of this disclosure require video data comprising a series or set of frames, other aspects may require only a lower resolution still camera, for example, configured to capture single images at specific points in time. Although not illustrated, the device 104 may include additional elements configured to operate in conjunction with the camera 108. For example, the device 104 and/or the camera 108 may further include illumination elements and/or focusing optics.

As noted above, facial recognition and other biometric authentication techniques are intended to only authenticate authorized users at the device 104. In the example of FIG. 1A, the camera 108 may be configured to capture one or more images of the user 102 to compare those images to stored images of authenticated users. When a match is determined, the user is authenticated. In the example illustrated in FIG. 1B, authentication may be used to allow a user to unlock the device 104. More specifically, in FIG. 1B, an image 110 of the user may be displayed on the display 106, along with text 112. The image 110 and the text 112 may provide the user with visual cues indicating that authentication was successful. The image 110 and the text 112 are examples of elements that may be presented and are not limiting. In other implementations, an audible and/or haptic feedback may be provided as an alternative to or in conjunction with the image 110 and/or the text 112. The image 110 and/or the text 112 may be configurable, e.g., to provide the user with a different response upon being authenticated.

Figure 1B:
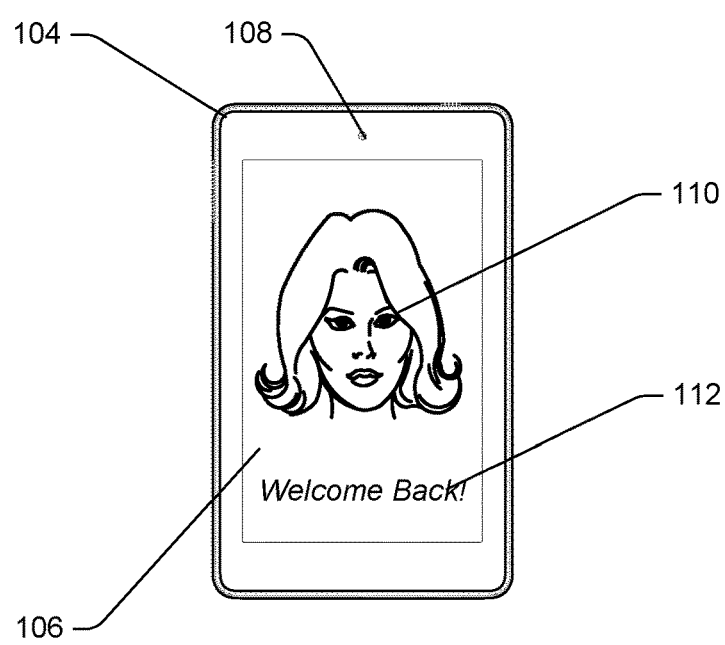
FIG. 1B is a plan view of the electronic device of FIG. 1A, illustrating the user being granted access to the electronic device.

Although FIGS. 1A and 1B depict an embodiment in which the device 104 is unlocked upon authentication of the user 102, authentication may be useful in other implementations. For example, authentication may be used to access specific applications and/or functionalities on a device. For example, a user may be authenticated to access sensitive or confidential images or content. In still other examples, authentication may be required to complete transactions involving the device 104. For example, the user 102 may be authenticated to authorize a purchase requested via the device 104 or to authorize a payment requested via the device 104.

In implementations of this disclosure, authentication may require analysis of video data captured at the device 104. For example, discrete frames of the video data may be used to authenticate a user attempting to access information and/or functionality on a computing device such as the computing device 104. For example, facial feature extraction and comparison techniques may be applied to one or more frames of the video data.

Figure 2A:
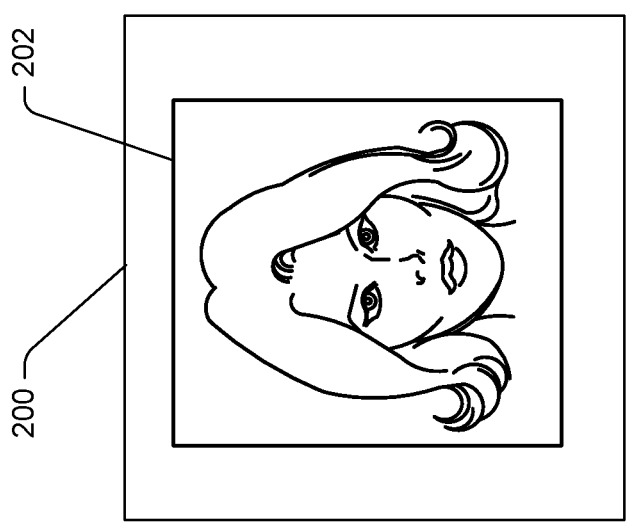
FIG. 2A illustrates an example digital image of a user.
Figure 2B:
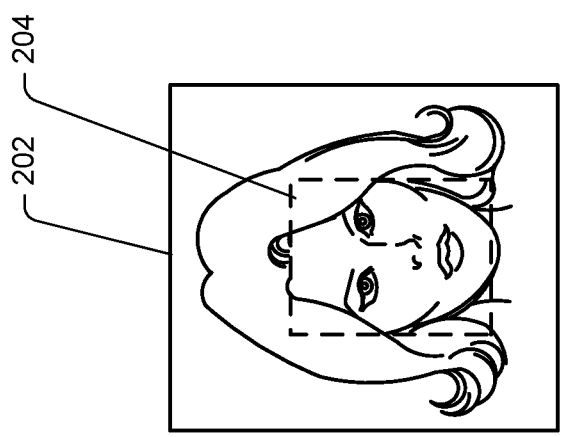
FIG. 2B illustrates the digital image of FIG. 2A, in which a portion of frame/image including the facial features is located.
Figure 2C:
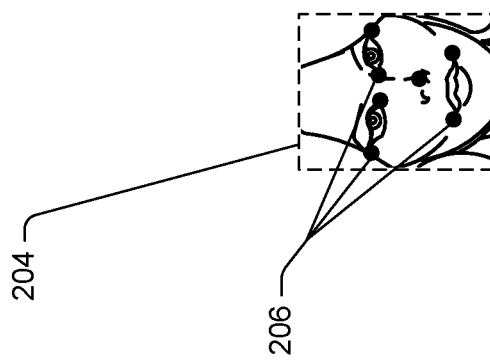
FIG. 2C is the example portion of the image of FIGS. 2A and 2B.

FIGS. 2A through 2C illustrate an example of using the features of a face as cues for facial recognition. As noted above, although functionality of this disclosure may be made in terms of facial recognition, this disclosure is not limited to facial recognition. Instead, aspects of this disclosure are useful in connection with many biometric authentication techniques that include comparing captured video or images to stored video and/or images of authenticated users, to determine matches therebetween, for purposes of authenticating a user. By way of non-limiting example, in addition to facial recognition techniques, implementations of this disclosure may be useful in systems that include iris scanning, retinal scanning, free-space palm scanning, or imaging of other bodily features.

As illustrated in FIG. 2A, a digital image 200, which may be a frame of video data, e.g., a video stream, may include a head portion 202. The head portion 202 may be detected using a conventional head detection algorithm. In some embodiments, the computing device may utilize one or more motion sensors, such as an electronic gyroscope or an inertial sensor, to assist with location determinations. For example, a rotation of the device 104 can cause a rapid shift in objects represented in an image, such that image stabilization might not be attempted if an amount of motion exceeds a determined amount. For smaller movements, the information from the motion sensors can be used to provide a starting point for the feature detection in a subsequent time, which can increase the speed of the detection process and reduce the amount of processing and power required. Various other types of movement or motion information can be used as well.

Once the head region 202 to be analyzed is determined, one or more algorithms may be used to identify features of the user's face. For example, FIG. 2B illustrates an example in which within the head portion 202, a portion 204 of the image that corresponds to the user's face may be identified. Algorithms used to identify the head portion 202 and the face portion 204 may include any appropriate algorithm known or used for such purposes. For example, such algorithms may include one or more of a template matching algorithm, a neural network algorithm, a Fisher linear discriminant algorithm, a maximal rejection classifier algorithm, support vector machine algorithm, and edge filtering algorithm, and edge detecting algorithm, and/or the like. The ability to locate the head position in the image can reduce the amount of resources otherwise required, as the analysis may be limited to the face portion 204. Moreover, in some embodiments, facial recognition may not be performed unless a head or face can first be detected in the captured image.

As illustrated in FIG. 2C, the facial portion 204 can be isolated, for example, for analysis by one or more facial recognition algorithms. Such algorithms may attempt to identify discrete facial features represented in the image. This may include identifying unique or distinguishing points 208, facial marks, geometric magic shapes, distances, or other such features on the face. Some example facial recognition algorithms may include linear discriminant analysis algorithms, Fisher—face algorithms, hidden Markov model-based algorithms, principal component analysis algorithms, and/or neuronal motivated dynamic link matching algorithms. Template matching may also be used in some examples to identify whether a user is represented in an image. For example, template matching may match a predefined face pattern or parameter test function to locate a user within an image. Templates may be prepared off-line. In template matching, correlation values for the head and facial features may be obtained by comparing one or more templates to an input image, and the presence of a face is determined from the correlation values. Another such approach includes a classifier trained from positive examples of represented in images and negative examples of images with no persons. Application of the classifiers to an input image can determine whether a user exists in an image, for example.

The approach as just described may generally be used to identify that an image captured at the device corresponds to an authorized the user of the device. However, implementations of this disclosure may be intended to utilize information to not only identify the authorized user, but also to verify that the captured images are of an actual, physical person and not a representation of the person. In one example embodiment, video data of the field of view of the camera associated with the device may be analyzed to determine movement of one or more objects within the frames comprising the video. For example, one or more of movements of the user's face, movements of various facial features of the user, and/or movement of environmental objects separate from the user may be analyzed to determine that the camera is capturing video of an actual person, instead of a representation of the person, such as a still image or a video playback including the user. For example, after at least a portion of the user has been detected in image data captured by the camera of the computing device, the detected portion may be tracked and used to verify that the user is an actual person. As noted above, aspects of this disclosure may be well suited to determining that a person is being authenticated instead of a digital representation of that person. For instance, aspects of this disclosure are particularly suited to determining that playback of a video depicting a user is being presented for authentication, instead of the actual person. Such determination is made possible in part by a difference between a capture rate of a camera capturing the video data analyzed to authenticate the user and a display rate of conventional displays used to display content. FIGS. 3-6 illustrate some of these concepts.

Figure 3:
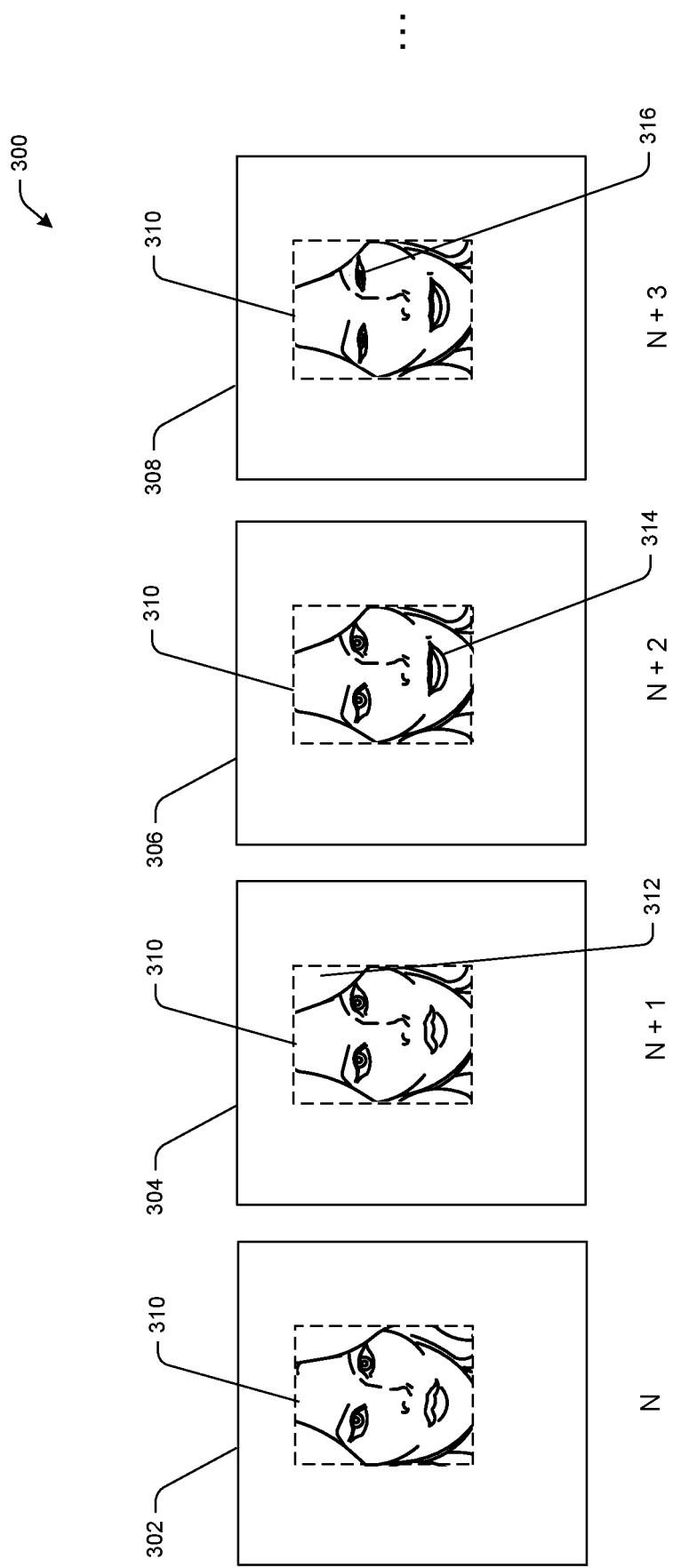
FIG. 3 illustrates first example video data comprising a first plurality of frames of successive digital images.

FIG. 3 shows video data 300, e.g., a video stream, captured by a camera associated with a device, such as the camera 108 of the device 104 illustrated in FIGS. 1A and 1B. The video data is representative of a video captured of an actual person. As illustrated, the video data 300 includes successive frames 302, 304, 306, 308, each frame comprising a digital representation of a captured field of view of the camera. In each of the example frames 302, 304, 306, 308, a face 310 has been identified and isolated for analysis. Although the face 310 is used for analysis in this example, other bodily features may instead be identified and/or isolated for consideration. For example, a user's eyes, palm, or other features may be used alternatively. Moreover, in some implementations, the face may be isolated for facial recognition processing, but the entirety of the frame may be considered to determine whether the subject of the recording is an actual person or a spoof attempt.

As noted above, the frames 302 through 308 are successive frames, occurring consecutively in the video data. In some implementations, the successive frames may also be adjacent frames, although in other implementations, frames may be removed from the video data without affecting some of the benefits achieved by implementations of this disclosure. Accordingly, the frames include representations of the face 310 at discrete, consecutive moments in time. The time difference between the frames depends upon settings associated with the camera used to capture the video data 300. For example, when the camera is configured to capture video at 60 frames per second, the second frame 304 depicts the face 310 $1/60^{th}$ of a second after the first frame 302 depicts the face 310. Moreover, the third frame 306 depicts the face 310 $1/60^{th}$ of a second after the second frame 304, and the fourth frame 308 depicts the face 310 $1/60^{th}$ of a second after the third frame 306. Similarly, if the camera is configured to capture video at 90 frames per second, each of the frames depicts the face 310 $\frac{1}{90}^{th}$ of one second after the preceding fame. Other frame rates also are known.

When recording a human face, slight changes will be detectible from frame to frame. For example, comparing the first frame 302 to the second frame 304, the user's head 312 tilts. Comparing the second frame 304 to the third frame 306, movement of lips 314 of the user is detectible, e.g., as the user smiles. Similarly, comparing the third frame 306 to the fourth frame 308, movement of eyes 316 of the user is detectible, e.g., as the user blinks. When capturing video, e.g., a video stream, of an actual, living person, regardless of the capture rate of the camera, some detectible difference exists between each adjacent pair of frames in the video data. Movement of the head 312, lips 314 and the eyes 316 are provided as examples, but any number of changes may be occurring, and some or all of these changes may be detectible via image processing. By way of non-limiting example, voluntary movements such as wrinkling of the nose or furling of the brow may be detectible, as may be involuntary movements such as skin tone changes associated with blood circulation and/or pupil dilation and constriction. The video data 300 includes detectible differences between adjacent frames, because the video data 300 is a video of an actual person.

Although the implementation illustrated in FIG. 3 isolates and analyzes the face, other frame-to-frame changes may be detectible even when the face is not used. For example, movement of the person relative to an environment of the person may be perceived. Also, although the head/face is illustrated, in other recognition techniques, e.g., palm recognition, the face may not be in the image. In these examples other movement, e.g., movement of the fingers and/or hand relative to each other and/or relative to an environment may be used to determine whether frames are identical.

Figure 4:
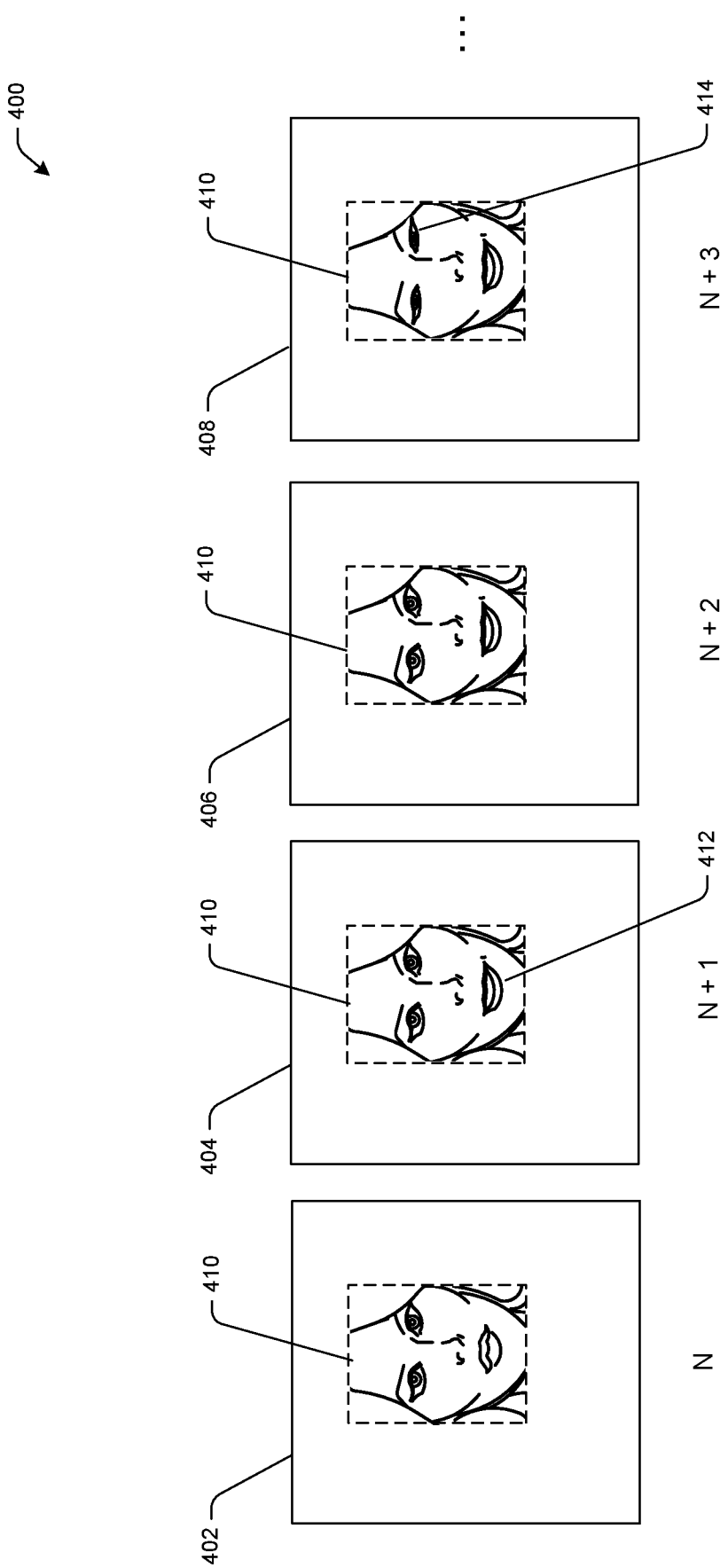
FIG. 4 illustrates second example video data comprising a second plurality of frames of successive digital images.
Figure 5:
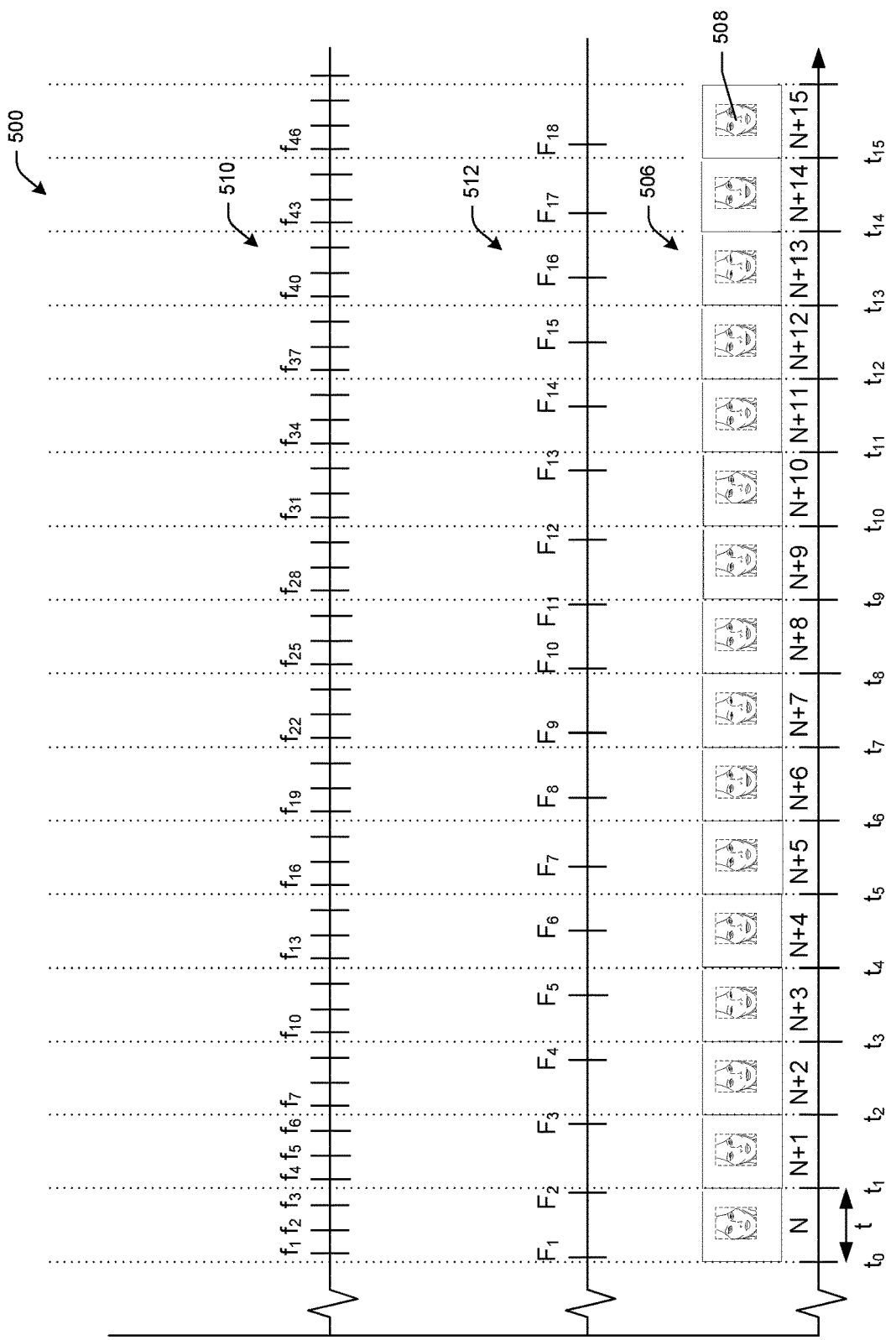
FIG. 5 is a diagram illustrating video data associated with an unauthorized attempt to gain authentication on an electronic device.
Figure 6:
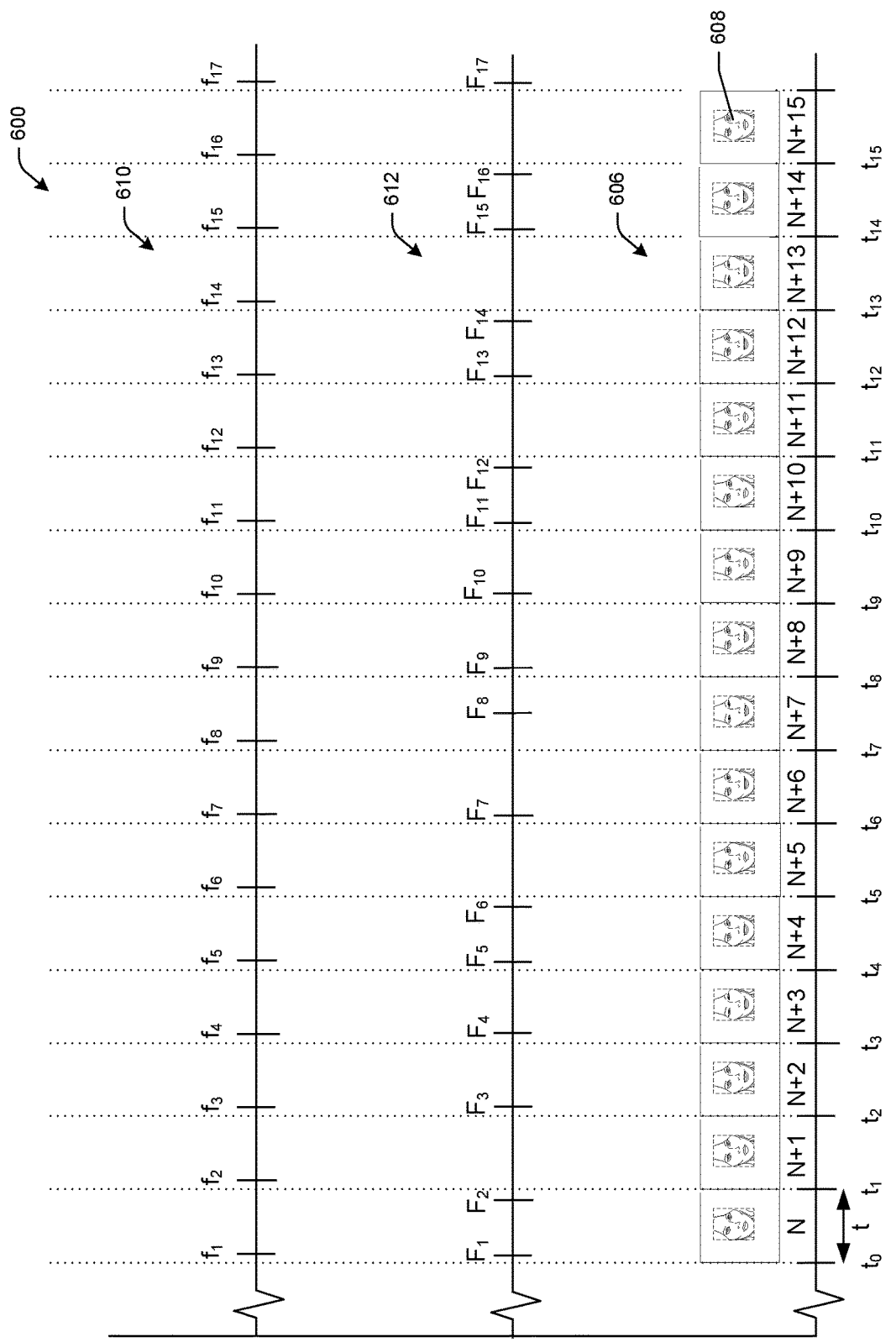
FIG. 6 is another diagram illustrating additional video data associated with an unauthorized attempt to gain authentication on an electronic device.

As noted above, in some spoofing attacks, users may place a display in the field of view of a camera of a device to be accessed, and the display may be streaming or playing a video of an authorized user. In this spoofing attack, one would expect that the video will also include user movements, both voluntary and involuntary. However, physical constraints of the display may result in duplicate frames captured by the camera of the device attempting to authenticate user. FIGS. 4-6 are illustrative.

FIG. 4 shows video data 400, e.g., a video stream, similar to the video data 300 discussed above with reference to FIG. 3. The video data 400 includes a plurality of successive frames including a first frame 402, a second frame 404, a third frame 406, and a fourth frame 408. Also similar to the video data 300, each of the frames 402, 404, 406, and 408 includes a representation of a face 410. Comparing adjacent frames of the video data 400, relative movement of lips 412 on the face 410 is detectible between the first frame 402 and the second frame 404, and relative movement of eyes 414 on the face 410 is detectible between the third frame 406 and the fourth frame 408. However, there is no detectible difference between the second frame 404 and the third frame 406. In aspects of this disclosure, a determination that the second frame 404 matches the third frame 406 may signify that the video data 400 is not of an actual person, but is of a video playback of the authorized user on a display device.

In one example scenario, the series of frames in FIG. 4 may be acquired at sixty frames per second and the frames are images of a display screen displaying video comprising a spoofing attempt at thirty frames per second. Because the display refreshes only every $\frac{1}{30}$th of a second, but the video data includes frames captured every $\frac{1}{60}^{th}$ of a second, duplicate frames occur regularly in the video data 400, as illustrated by the second frame 404 and the third frame 406. Theoretically, if the display rate is half the frame rate of the camera used to capture the video data 400, a frame immediately preceding frame 402 (i.e., frame N−1) would be a duplicate of the first frame 402 and a frame immediately after the fourth frame 408 (i.e., frame N+4) would be identical to the fourth frame 408. As will be appreciated, increasing the frame rate of the camera relative to the display rate will increase the frequency and/or number of repeated frames. This concept is illustrated in greater detail in FIG. 5.

FIG. 5 is a graph 500 illustrating identification of a spoofing attempt according to aspects of this disclosure. More specifically, FIG. 5 illustrates a scenario in which a nefarious actor uses a display 502 (the "spoof display" 502 in FIG. 5) in an attempt to gain unauthorized authentication on a device using a spoofing attack. As illustrated, the spoof display 502 displays video at 80 frames per second. FIG. 5 also illustrates two devices 504-1, 504-2 on which the spoofing attack may be attempted. For example, the actor may use the spoof display 502 to display a video of an authorized user's face in front of a camera of the device 504-1, 504-2, thereby attempting to trick the respective device into authenticating the nefarious actor, using the authorized user's image in the video. The first device 504-1 is illustrated as having a camera that captures images at a rate of 240 frames per second while the second device 504-2 is illustrated as having a camera that captures images at a rate of 90 frames per second.

As illustrated in FIG. 5, the spoof display 502 displays video data 506, e.g., a video stream, comprising a plurality of frames, N, N+1, N+2, . . . , each having an image of an authorized user's face 508. Because the video is a playback of video of the authorized user, it is expected that any two adjacent frames are non-identical. For instance, detectible facial movements may be apparent, the face may move relative to its surrounding, or facial characteristics, e.g., coloring, may change from frame-to-frame. As noted above, the display 502 is refreshed eighty times per second, so each frame in the video data 506 is displayed $\frac{1}{80}^{th}$ of one second after the previous frame was displayed. Accordingly, in FIG. 5, t is $\frac{1}{80}^{th}$ of one second with $t_0$, $t_1$, $t_2$ . . . illustrating increments in time at which the spoof display 502 is refreshed.

In a first spoof attack, the spoof display 502 may be placed in front of the first device 504-1, such that playback of the video data 506 is visible to the camera associated with the first device 504-1. In this implementation, the first device 504-1 uses facial recognition techniques to authenticate authorized users, and the user depicted in the frames N, N+1, . . . is an authorized user. Accordingly, the user depicted would be authenticated at the first device 504-1 using conventional facial recognition techniques. However, according to aspects of this disclosure, authentication will be denied. As illustrated, the first device 504-1 has a camera that captures video data 510 comprising a plurality of frames $f_1$, $f_2$, $f_3$ . . . , at 240 frames per second. In FIG. 5, the frames $f_1$, $f_2$, $f_3$ . . . , are illustrated as being captured along the time axis, concurrently with the playback of the video data 506 on the spoof display 502. Since the camera of the first device 504-1 captures video frames every $\frac{1}{240}^{th}$ of one second, three times more frequently than the spoof display 502 refreshes, three consecutive frames in the video data 510 are identical. For instance, because frames $f_1$, $f_2$, and $f_3$ are all captured between times $t_0$ and $t_1$, those three frames will be substantially identical to each other, and to the frame N on the spoof display. Similarly, frames $f_4$, $f_5$, and $f_6$ are all captured between times $t_1$ and $t_2$, and thus will be substantially identical to each other as well as to frame N+1 of the video data 506 on the spoof display 502. According to implementations of this disclosure, when it is determined that consecutive frames in the video data 510 match, the spoof attempt is detected, and authentication is denied.

As just described, the captured video data 510 includes repeated clusters of three matching frames, a result of the capture rate of the first device 504-1 being three times the display rate of the spoof display 502. FIG. 5 also illustrates video data 512, comprising a plurality of frames $F_1$, $F_2$, $F_3$ captured by a camera associated with the second device 504-2. The camera associated with the second device 504-2 has a capture rate of 90 frames per second. As illustrated, because the capture rate (90 fps) of the camera of the second device 504-2 is higher than the display rate (80 fps) of the spoof display 502, the video data 512 will contain matching frames. In this example, frames F1 and F2 are both captured between times $t_0$ and $t_1$, and as a result those frames will be substantially identical to each other, and to the frame N in the video data 506 on the spoof display 502. However, frame $F_3$ is the only frame captured between times $t_1$ and $t_2$, frame $F_4$ is the only frame captured between times $t_2$ and $t_3$, frame $F_5$ is the only frame captured between times $t_3$ and $t_4$, etc., up to frames $F_{10}$ and $F_{11}$, which are both captured between times $t_8$ and $t_9$. Thus, consecutive frames between and including frames $F_3$ through $F_9$ will be different from each other and from frames adjacent them in the video data 512. However, frames $F_{10}$ and $F_{11}$ will be substantially identical to each other and to frame N+8 in the video data 506 output by the spoof display 502. As will be appreciated, in the illustrated embodiment, every eighth frame, e.g., frames N, N+8, N+16, etc., of the video data 506 will occur twice in the video data 512. By identifying these matching frames, aspects of the present disclosure are able to detect a spoofing attempt, and deny authentication.

FIG. 6 illustrates a graph 600 similar to the graph 500 of FIG. 5. The graph 600 illustrates a scenario in which a nefarious actor uses a display 602 (the "spoof display" 602 in FIG. 6) in an attempt to gain unauthorized authentication on a device using a spoofing attack. In the example of FIG. 6, the spoof display 602 has a display rate of 60 frames per second. FIG. 6 illustrates two devices 604-1, 604-2 on which the spoofing attack may be attempted. As with the examples of FIG. 5, the nefarious actor may use the spoof display 602 to display a video of an authorized user's face in front of a camera of the device 604-1, 604-2, to trick the respective device into authenticating using the authorized user's image in the video. Both the first device 604-1 and the second device 604-2 are illustrated as having a camera that captures images at a rate of sixty frames per second. However, the second device 604-2 uses dynamic control of its camera, as will be described in more detail below Similar to the implementations illustrated in FIG. 5 and discussed above, the spoof display 602 displays video data 606 comprising a plurality of frames, N, N+1, N+2, . . . , each having an image of an authorized user's face 608. Because the video is a playback of video of the authorized user, it is expected that any two adjacent frames are non-identical. The spoof display 602 is refreshed sixty times per second, so each frame in the video data 606 is displayed $\frac{1}{60}^{th}$ of one second after the previous frame was displayed. Thus, in FIG. 6, t is $\frac{1}{60}^{th}$ of one second with $t_0$, $t_1$, $t_2$ . . . illustrating increments in time at which the spoof display 602 is refreshed.

In a spoof attack, the spoof display 602 may be placed in front of the first device 604-1, such that playback of the video data 606 is visible to the camera associated with the first device 604-1. In this implementation, the first device 604-1 uses facial recognition techniques to authenticate authorized users, and the user depicted in the frames N, N+1, . . . is an authorized user. The first device 604-1 has a camera that captures video data 610 comprising a plurality of frames $f_1$, $f_2$, $f_3$ . . . . The frames $f_1$, $f_2$, $f_3$ . . . , are illustrated as being captured along the time axis, concurrently with the playback of the video data 606 on the spoof display 602. Since the camera of the first device 604-1 captures video frames at the same rate that the spoof display 602 refreshes, the camera associated with first device 604-1 is unable to detect the spoof. For instance, frame $f_1$ is captured between times $t_0$ and $t_1$, frame $f_2$ is captured between times $t_1$ and $t_2$, and so forth. Thus, the spoof display 602 may be successful because the camera's capture rate is not faster than the display rate.

In some implementations of this disclosure, however, a camera having the same nominal capture rate as a refresh rate of a display used in a spoofing attack may be used to identify a spoof. For example, the second device 604-2 has the same 60 frame per second capture rate as the first device 604-1. However, the camera may be controllable to read out captured images at sixty frames per second, but to vary the frequency at which consecutive images are captured. For instance, globally-shuttered cameras are known that utilize local storage at the sensor, which may allow for overlapping of two exposures. For example, after a first exposure is taken, an analog storage node is read out for each pixel of the camera sensor. While that storage node is read out of the imager, a second exposure can be captured. However, because there is only a single storage node for each pixel, the second exposure cannot be stored to allow for a third exposure. Instead, the second frame will be read out according to the frame rate of the camera. Thus, the exposures are captured more quickly than the frame rate, but may be bussed out of the camera according to the frame rate. In this example, while the average capture rate is 60 frames per second, successive pairs of frames can be captured at varied rates.

An example of this concept is illustrated by video data 612 in FIG. 6. The video data 612 includes a plurality of successive frames $F_1$, $F_2$, $F_3$ . . . . Each of the frames $F_1$, $F_2$, $F_3$ . . . is indicated on the time line at the time at which the exposure associated with the respective frame is captured. As illustrated, by dynamically adjusting the rate at which the exposure are taken, two exposures, e.g., those corresponding to frames $F_1$ and $F_2$, are obtained between time $t_0$ and $t_1$. Accordingly, both frames $F_1$ and $F_2$ will show the same frame N from the spoof video data 606. Similarly, because an exposure associated with frame $F_6$ is taken more quickly than the nominal $\frac{1}{60}^{th}$ of one second, exposures associated with frames $F_5$ and $F_6$ are taken between times $t_4$ and $t_5$ and will thus both be of frame N+4 of the spoof video data 606. In the video data 612, frames $F_{12}$, $F_{14}$, and $F_{16}$ are also illustrated as being taken more quickly, relative to the previous frame. Merely speeding up capture of various frames, however, may not be sufficient to reliably capture duplicate frames. Accordingly, in implementations, timing of the capture of successive frames may be otherwise adjusted, too. For example, frame F8 is illustrated as being delayed longer than the time increment t. By varying the time dynamically, the likelihood is increased that matching frames will be detected.

Figure 7:
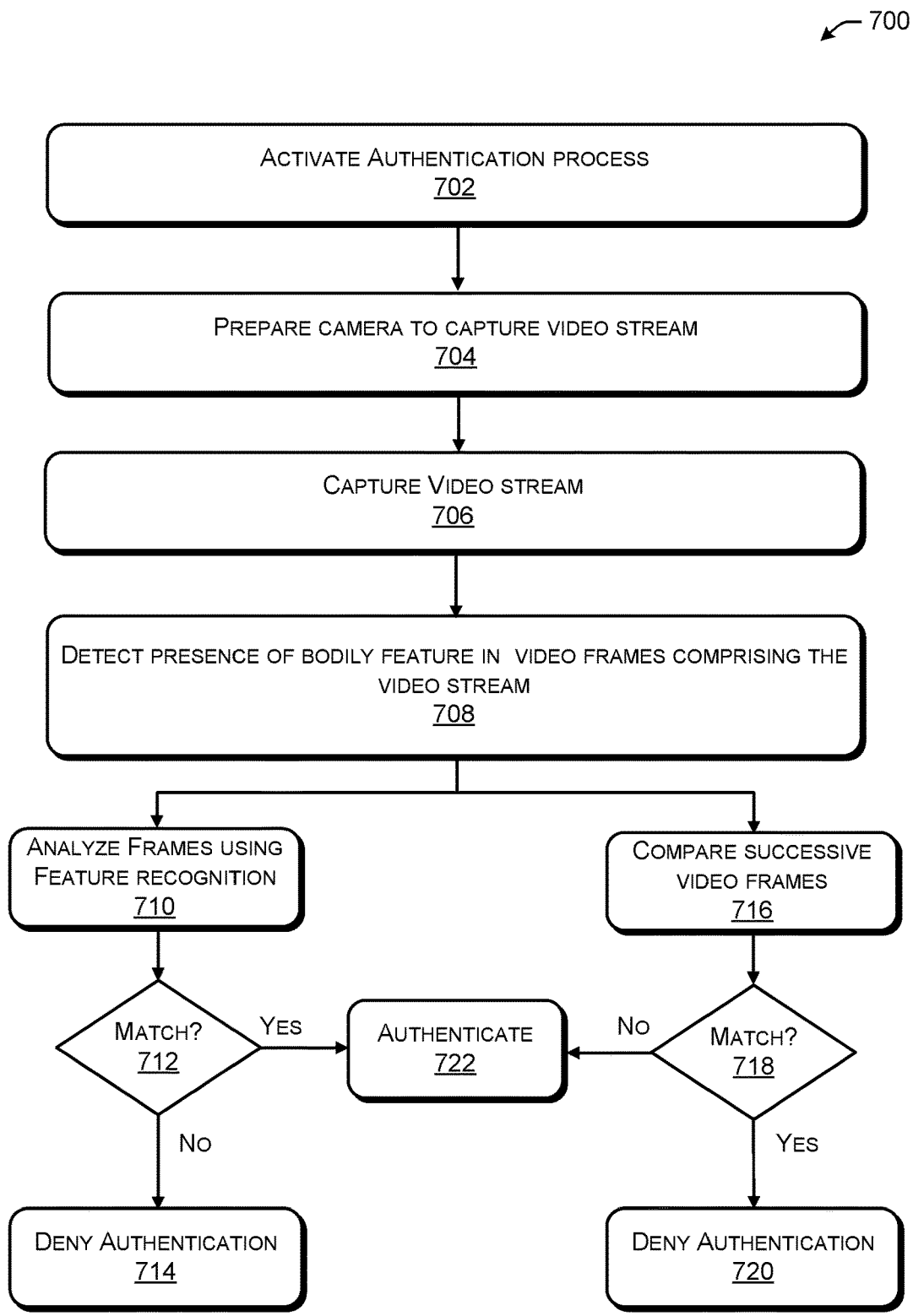
FIG. 7 is a flow diagram illustrating an example process to implement authentication based on digital video data analysis.

FIG. 7 is a flow diagram illustrating an example method 700 of authenticating a user using biometric authentication techniques according to example implementations of the present disclosure. The method 700 shown in FIG. 7 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

It should be appreciated that the subject matter presented herein may be implemented as a computer process, a computer-controlled apparatus, a computing system, or an article of manufacture, such as a computer-readable storage medium. While the subject matter described with respect to the method 700 is presented in the general context of operations that may be executed on and/or with one or more computing devices, those skilled in the art will recognize that other implementations may be performed in combination with various program/controller modules. Generally, such modules include routines, programs, components, data structures, and other types of structures that perform particular tasks or implement particular abstract data types.

Those skilled in the art will also appreciate that aspects of the subject matter described with respect to the method 700 may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

As shown in FIG. 7, an example method 700 of authenticating a user at a computing device may include, at 702, activating an authentication process. For example, the authentication process may be activated in response to any appropriate event, such as a person attempting to access certain data or functionality and the device, a person coming within a field of view of the camera of the device, and activation of the device, a request to perform a transaction using the electronic device, or the like. Activation of the authentication process may include prompting a user to place her face or other bodily feature in the field of view of the camera or the like.

The example method 700 also may include, at 704, preparing a camera to capture video data to authenticate a user. As noted above with regard to FIGS. 4-6, an attempt to spoof the biometric authentication system may include presenting a display device in the field of view of a camera and presenting a video of an authorized user on the display device. Aspects of the present disclosure involve utilizing a difference between a capture rate of the camera and a display rate of the display device to determine that the display device is in the field of view of the camera, instead of the actual person depicted in the video playing on the display device. As will be understood, if the capture rate of the camera on the display rate of the display device are the same, or the capture rate of the camera is slower than the display rate of the display device, the benefits of the disclosure may not be achieved. Accordingly, at 704, preparing the camera capture the video data may include configuring the camera to increase the frame rate at which the camera captures images, for example, by increasing the video capture speed to a maximum video capture speed for the camera.

In other embodiments, the camera may be configured to vary the timing at which successive frames are captured. For example, some conventional cameras have a fixed frame rate, resulting in each frame being captured at a fixed time interval. By way of example, a camera having a frame rate of 60 frames per second captures each frame one-sixtieth of one second after the preceding frame and before the next frame. Similarly, a camera having a frame rate of 120 frames per second captures each frame one-one hundred twentieth of a second after the preceding frame and one-one hundred twentieth of a second before the next successive frame. However, as exemplified above with reference to FIG. 6, in implementations of this disclosure, a camera may be controlled to dynamically change its frame rate. For instance, in some cameras, including global shutter cameras, it may be possible to capture frames of images that, although output from the camera at the frame rate, are actually captured more closely in time. For instance, the camera may be controlled to capture images more closely in time $t_0$ each other, although the camera may have to wait for the frames to be read out before taking another frame. Thus, it may be possible to dynamically change the time between which frames are captured. This may be particularly useful as display rates of displays increase and become less than half typical camera frame rates.

The method may also include, at 706, capturing video data using a camera of a computing device, such as the camera 110 of the computing device 104, discussed above. The video data includes a plurality of digital video frames depicting at least a portion of a field of view of the camera. Example video data are depicted in FIGS. 3-6, and discussed above with reference to those Figures.

The method may also include, at 708, detecting presence of a bodily feature in video frames comprising the video data. For example, information associated with the frames of the video data may be analyzed to detect lasers head, face, palm, retina, iris, or other bodily feature. Such features may be isolated in each of the frames of the video data for further processing and analysis.

Once a representation of a bodily feature is identified in each of the frames of the video data, and 710, the method may also include analyzing the frames of the video data using feature recognition. This analysis may include comparing features of the representation of the bodily feature to stored representations of bodily features to determine that the representation in the frame corresponds to an authorized user. By way of non-limiting example, 710 may include analyzing a single frame of the video data using facial recognition techniques to determine that a representation of a face in the single frame corresponds to an authorized user. Example facial recognition techniques and algorithms are enumerated above and may be known to those having ordinary skill in the art.

The method 700 may also include, at 712, determining whether 710 resulted in a match of the bodily feature depicted in the frame(s) of the video data with a bodily feature of an authorized user. As used throughout this disclosure, the term "match" may be a relative term, designating a similarity or likeness at or above a minimum level of confidence, a minimum threshold, or other such measure. For example, frames that are indicated as matching, substantially matching, duplicates or substantial duplicates are frames that have a similarity or likeness above a minimum level of confidence or threshold. If it is determined that applying the feature recognition at 710 has resulted in no match, authentication is denied, at 714. Specifically, because the detected physical feature does not match any physical feature of an authorized user, feature recognition fails and authentication is denied.

Thus, according to the preceding acts, authentication may be denied when feature recognition fails to match representations in frames of video data with features of authenticated users. However, the mere fact that feature recognition was performed successfully may not result in an authentication. For instance, as noted above, the feature recognition processing may have been spoofed by an image or video of an authenticated user.

To protect against spoofing, the method 700 may also include, at 716, comparing successive video frames in the video data to determine whether there are any matches between successive video frames. As discussed above with reference to FIGS. 4-6, in video data associated with a video of an actual person, some detectable change will be observable between any two successive frames. For instance, features associated with the actual person may move and/or involuntary changes may be detectable. A person being authenticated may tilt her head, purse her lips, close her eyes, or furl her brow, and movements associated with these actions will create detectable differences between successive frames in the video data. Moreover, even in a situation in which the user attempts to remain perfectly still while successive frames in a video data are captured, involuntary movements will still create a differentiation between those frames. For instance, eye movement, such as strabismus, or involuntary changes in skin coloration, e.g., caused by the flow of blood in the circulatory system, may be identifiable between successive frames.

In some implementations of this disclosure, correlation techniques may be applied to determine whether successive frames in the video data match. For example, correlation between successive images may be determined by selecting a first subset of pixels, e.g., a 10×10 subset consisting of 100 pixels, from the first image and comparing values of the pixels in the first subset to corresponding values in a second subset of pixels in the second image that corresponds in size to the first subset, e.g., to a 10×10 subset. For example, each of the pixels in the first subset may include an associated color value and the color values may be compared, on a pixel-by-pixel basis, to color values of corresponding pixels in the subset from the second image to determine a correlation value or score. For example, a correlation function may be used to compare the values on a pixel-by-pixel basis, and provide a correlation value or score for the compared first subset/second subset. By way of non-limiting example, the correlation function may include a cross-correlation or a sum of squared differences (SSD). As will be appreciated by those having ordinary skill in the art, in cross-correlation, the score may range between −1 and 1, with 1 representing an exact match, whereas, in SSD, a lower score represents better similarity, with a score of 0 designating that the considered pixel subsets are identical. Although this example uses color values, other values associated with the pixels, e.g., intensity values, luminance values, or the like may be used.

When images are identical, e.g., because they are captured images of the same displayed video frame as in a spoofing attack, strong correlation is expected for every pixel subset and correlation scores provide a metric for determining this similarity. In some implementations, the considered second subset may correspond in location in the first image to a location of the first subset in the first image. For instance, it would be expected that an identical image would produce identical pixels at the same locations in the image. However, and as will be discussed in more detail below, in some implementations of this disclosure, the first subset of pixels may be compared to multiple second subsets of pixels. More specifically, the first subset of 100 pixels may be compared to a plurality of 100 pixel subsets in the second image, e.g., to account for manipulation of a display screen displaying the spoof video. When a strong correlation occurs in a transformed space, e.g., a strong correlation occurs at a rotated position in the second image or at a translated position in the second image, a spoof attempt may be detected.

In another example embodiment, comparing the successive video frames may include determining one or more vectors associated with each of the video frames. For instance, in embodiments of this disclosure, a device performing the user authentication may include image processing functionality, which may include a video encoder. As part of its functioning, the video encoder may determine one or more vectors that describe differences and/or similarities between successive frames. In some implementations, the vectors may include motion vectors, indicating movement of one or more features in adjacent frames of captured video data. For instance, the motion vectors may indicate a direction and magnitude of movement of one or more pixels from frame to frame. When the motion vectors indicate that there is no motion between successive frames, e.g., the magnitude of each of the motion vectors is at or below a threshold magnitude, the determination may be made that the frames are substantial duplicates of each other. The motion vectors may be used in conjunction with or as an alternative to detecting changes in color and/or intensity, for example. Moreover, the motion vectors may be used as a clue to identify transformations that may be applied to correct for certain changes, as will be described in more detail below.

Processing according to 716 will likely be carried out for several frames and/or some minimum amount of time. For instance, as illustrated by the data 512, 612, the matching frames may be spaced throughout the video data, instead of occurring every frame, as in the video data 510. A robust system would consider enough frames to find those intermittent matches. As will be appreciated, the longer the video data considered, the more likely matches are to be discovered. However, other constraints, including but not limited to constraints associated with a user experience, may limit the time used to identify spoofs in practice. For instance, a threshold time limit may be set for identifying matches. As just described, the matching detection is done in parallel with feature recognition, and thus, to maintain the number of frames considered may correspond to an amount of time required to do the feature recognition. In other implementations, the amount of video considered may be set without regard to the feature recognition. For example, times over about 150 milliseconds are generally perceptible to a user, and the frames may be considered for approximately this amount of time. In the example of FIG. 5, fourteen frames of the video data 512 would be captured in 150 milliseconds. Any fourteen frame sample of the video data 512 would include one or two matching pairs, and thus authentication would be correctly denied.

While one match could be sufficient to indicate a spoof attack, it may be preferable to consider an even longer series of frames, with a threshold of two or more matches being required to deny authentication. To acquire additional matches, the length of time associated with the capture may be increased, e.g., to hundreds of milliseconds, in the first instance, or the system may be configured to consider more frames if a first match is discovered. The number of frames considered may also vary based on the application. For instance, lower security uses may consider fewer frames whereas higher security used may consider more frames. By way of non-limiting example, 150 milliseconds of frames may be considered to determine whether to grant access to a device, whereas 500 milliseconds of frames may be considered to determine whether to authenticate a user to make a purchase using the device, or access secure content. In still other implementations, a pattern of matches may be used to confirm that authentication should be denied. For example, as detailed above, when the frame rate of the camera and the display rate of the spoof display are fixed, a repeated pattern of image matches will become apparent, e.g., every eighth frame in FIG. 5. Taking into account a periodicity of the image matches may preclude random matches, e.g., caused by a relatively still person or the like, from unintentionally denying authentication.

The method 700 may also include, at 718, determining whether 716 resulted in a match of any two successive frames of the video data. As used herein, the term "match" may be a relative term, designating a similarity or likeness at or above a minimum level of confidence, a minimum threshold, or other such measure. For example, matching frames may be substantially similar, but not identical. For instance, changes in the ambient environment, such as lighting or positioning of objects may change, even in a spoofing attempt. If it is determined at 718 that successive frames of the video data match, the process determines that the video data represents a video capture of a still image or a rendering of a digital video. Specifically, because the video data is of a representation of a person, not an actual person, authentication is denied at 720.

Conversely, if at 718 it is determined that none of the successive frames of the video data match, it is determined that the video data is of an actual person. Assuming that feature recognition indicated a match, at 712, the user is authenticated at 722.

Thus, according to aspects of this disclosure, spoofing attempts may be identified when a camera captures "matching" images, i.e., two captures of the same displayed frame, such as the spoof display 502, 602. As will be appreciated by those having ordinary skill in the art, with the benefit of this disclosure, "matching" is a relative term, and generally involves a determination that one or more attributes of compared frames are within a predetermined threshold of each other. That is, while the same frame of video displayed on the spoof display 502, 602 may be captured two or more times by the camera of the device attempting authentication, there still may be differences between those captured video frames. For instance, the nefarious user may move the spoof display 502, 602 relative to the device upon which authentication is requested thereby producing changes in the captured image between frames. Similarly, reflections on the spoof display, ambient lighting or other background conditions may change and could make successive frames non-identical.

Accordingly, implementations of this disclosure may be configured to identify and/or overlook certain differences between adjacent frames and still find a match. For example, in the case in which the spoof display 502, 602 is moved, one or both of affine transformations and projective transformations may be applied to images in successive frames. More specifically, rotational, translational and scalar differences can be accounted for using affine transformations and effects of tilting the spoof display 502, 602 can be accounted for using projective transformations. Thus, assuming the spoof display 502, 602 is a flat display, the images may be investigated to determine whether they are identical, or invariant, under one or more of these transformation. By way of non-limiting example, one or more features may be identified in an image of a first frame and in an image of a second, successive frame. For example, pixels or points associated with a user's nose, eyes, lips, or some other landmark may be features recognized in each of the successive frames. Moreover, straight lines, such as parallel lines, may be features identified in the images. Locations of these features may then be compared to determine one or more transformations that describe the movement of the second image relative to the first image. In some implementations, the second image may be manipulated according to the transformation(s) and the images in the two frames may then be compared for differences. The result may be that differences between the images that are solely the result of manipulation of a flat display screen, e.g., translation, rotation, tilting, and the like of the display screen, will not preclude a finding that successive frames are substantially the same.

In addition, transforms are known that may be applied to both of two consecutive frames. The consecutive frames may then be compared in the transform space to determine matches, in implementations of this disclosure.

As described, affine transformations may be used to account for translational, rotational, and/or scalar differences and projective transformations may be used to account for tilt caused by movement of the spoof display during an authentication attempt. Thus, the affine and projective transformations may account for any difference in image caused by movement of a flat display. As will be appreciated by those having ordinary skill in the art with the benefit of this disclosure, additional transforms may be required to account for changes other than movement of a flat display. For example, accounting for movement of curved or flexible displays may require additional transforms and/or techniques.

In implementations of this disclosure, matches may be determined after applying appropriate transforms. For instance, similarity scores may be determined for consecutive frames by performing cross-correlation on the adjacent frames in the transformed space. As discussed above, correlation may be performed by selecting a subset of pixels, e.g., a 10×10 subset consisting of 100 pixels, from the first image and comparing values of the pixels in the subset to one or more subsets of pixels in the second image that correspond in size, e.g., to one or more 10×10 subsets from the second image. By considering the first subset of pixels from the first image to multiple subsets from the second image, e.g., by translating or rotating the first subset relative to the second image, correlation scores can be obtained for multiple comparisons of the first subset. In some instances, a correlation map showing these scores may be produced. According this correlation, and depending upon the correlation function used, relatively higher correlation scores may indicate that the images are more similar than relatively lower correlation scores. Correlation scores above a certain threshold may indicate a match in implementations of this disclosure. Moreover, when strong correlation is found when comparing a relatively large numbers of pixels, e.g., 100 pixels, further comparison may be done at a finer scale, e.g., 10 pixels, or a single pixel, to confirm the correlation.

Sub-pixel correlation methods also are known, and could be used. However, because the frames from the spoof display are expected to be identical, but for some environmental changes and/or movement of the spoof display, significant correlation may likely be apparent at relatively coarser resolutions. Nevertheless, in some implementations, it may be desirable to also investigate at finer resolutions, to ensure the match is actually a match, and not the result of a relatively-stationary person. The correlation may be done in the color space or the luminance space, for example.

As noted above, as an alternative to correlation, vectors, such as motion vectors, may be used to identify changes between frames in video data, e.g., a video stream. For example, video encoders, such as MPEG encoders are known that create vector maps that characterize movement from frame to frame. Such vectors are conventionally used in video compression and playback, but they may also be useful in aspects of the present disclosure. For instance, because the vectors identify movement between frames, they necessarily identify that something is moving from frame to frame, and thus the frames are not identical. In some implementations, the presence of motion vectors may be sufficient to determine that frames do not match. In other implementations, the vectors above a certain magnitude may be determinative of non-matching frames. In still other aspects, the vector map may be a useful hint to apply affine or projective transformations, as discussed above. For instance, a vector map consisting exclusively of motion vectors having the same magnitude and direction could be a hint that the image is of a display being moved. Thus, vector maps may be determinative of match/no match or they may be used as hints to apply transformations, before applying other matching techniques, such as the correlation described above.

While the determination that successive frames match is generally sufficient to refuse authentication according to aspects of this disclosure, in other implementations other factors also may be considered. For instance, displays used as spoof displays may be highly reflective, in which case the image captured of the spoof video data may include a reflection of the device doing the capturing. The device may be configured to recognize its reflection, and deny authentication. Other reflections may also be recognized, and could lead to denial of authentication. For instance, vector maps, such as those discussed above, could indicate movement in opposite directions, which could be a clue that the image includes reflection.

In accordance with the foregoing, improved devices and methods may provide improved protection against anti-spoofing attempts to thwart biometric safeguards. In implementations of this disclosure, digital video may be analyzed to authenticate a user by recognizing bodily features and by confirming that an actual user is requesting authentication, instead of video playback of the user.

Figure 8:
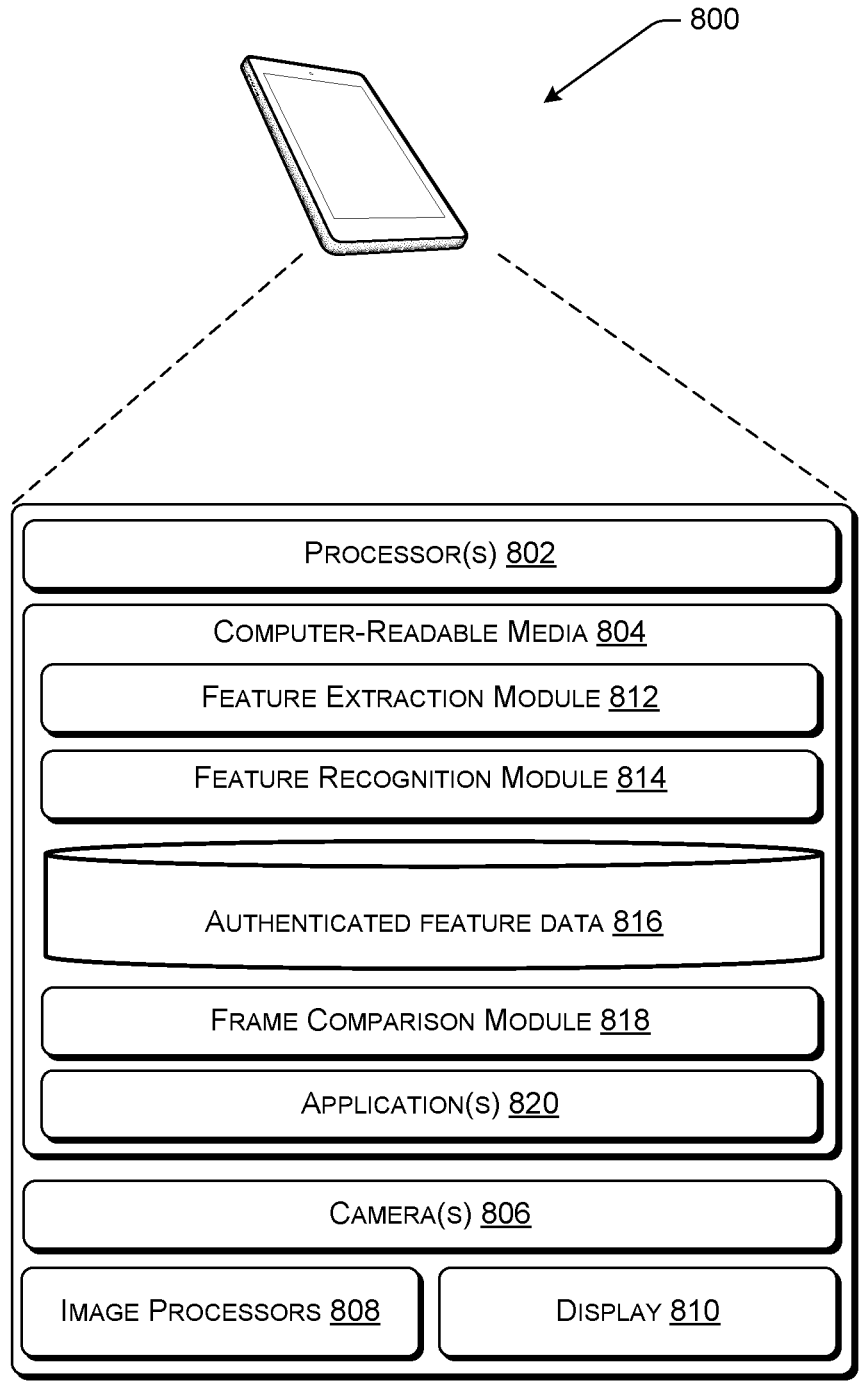
FIG. 8 illustrates details of an example device that may be used to implement authentication based on digital video data analysis.

FIG. 8 illustrates details of an example computing device 800 that can be used to implement the authentication techniques described herein. The computing device 800 in this example includes processor(s) 802, computer-readable media 804, one or more camera(s) 806, one or more image processor(s) 808, and a display 810. In FIG. 8, device 800 is illustrated as a handheld device, such as a tablet or smart phone. However, this example is provided for illustrative purposes and is not to be construed as limiting. Rather, the computing device 800 can also be implemented as other types of computing devices, such as any of the various computing devices described with reference to FIGS. 1A and 1B or elsewhere in this application.

The processor(s) 802 can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-On-a-Chip systems (SOCs), Complex Programmable Logic Devices (CPLDs), etc. In various examples, the processor(s) 802 can execute one or more instructions, modules, and/or processes to cause the device 800 to perform a variety of functions, such as those described as being performed by computing devices herein. Additionally, each of the processor(s) 802 can possess its own local memory, which also can store program modules, program data, and/or one or more operating systems.

In at least one configuration, the computer-readable media 804 of the device 800 can store components that facilitate interaction between a user and the computing device 800. For example, the computer-readable media 804 can include a feature extraction module 812, a feature recognition module 814, authenticated featured data 816 (e.g., templates or information corresponding to authenticated users), a frame comparison module 818, and one or more applications 820. The feature extraction module 812 may include program instructions to extract and/or isolate features in digital images, such as frames of digital video data captured by the camera 806. For example, features such as a head, a face, eyes, palms or portions thereof may be extracted from digital frames of a video data using the feature extraction module 812. The feature recognition module 814 may include program instructions to analyze the features extracted by the feature extraction module 812. For instance, the feature recognition module 814 may compare extracted features with the authenticated feature data 816 and determine that the extracted features match the authenticated feature data. The authenticated feature data 816 may include images of authenticated users, features associated with images of those users, or templates associated with physical features of those users. As noted above, featured extracted by the feature extraction module 812 may be compared to the authenticated feature data 816. As described above with regard to FIG. 5, this match may be one component used to authenticate a user at the device 800.

The frame comparison module 818 includes program instructions to compare successive or adjacent frames in digital video data. Specifically, the frame comparison module 818 may be configured to analyze physical features of the frames. For instance, the frame comparison module 818 may compare similar physical features in successive frames, to determine matches between consecutive frames. The frame comparison module 818 may also be configured to analyze other attributes of the frames, including a color space or intensity. As discussed above with regard to FIG. 7, determining that consecutive frames match each other may indicate that the video data includes images of a representation of a physical feature of a person, the video data does not include images of the physical features of the actual person. For instance, matching frames may be the result of a spoofing technique in which a non-authorized user seeks to gain authentication at the device 800 using an image or a video containing an image of an authenticated user. When the frame comparison module 818 determines that no consecutive frames match each other, the user may be authenticated.

The application(s) 820 may correspond to any other applications stored in whole or in part on the computing device 800. By way of example and not limitation, the applications 820 may include gaming applications, file sharing applications, browser applications, search applications, productivity applications (e.g., word processing applications, spreadsheet applications, computer-aided design applications, etc.), communication applications (e.g., email, instant messaging, audio and/or video conferencing, social networking applications, etc.). In some implementations, access to the application(s) or to features associated with the application(s) may require authentication of a user in accordance with the techniques described herein. The application(s) 820 can be stored in the computer-readable media 804 or otherwise accessible to the device 800 (e.g., via a network). In some examples, one or more of the applications 820 may be resources for which the authentication techniques described herein are usable to gain access.

While FIG. 8 illustrates the modules 812, 814 and 818 as being separate from the application(s) 820, in alternative examples, some or all of the modules 812, 814, 818 can be included in or integrated with an operating system of the device and/or one or more of the applications 820. In such examples, the operating system and/or application(s) 820 having the integrated authentication functionality can perform same or similar functionalities as described for the modules 812, 814, 818. Moreover, although the modules 812, 814, 818 and the authenticated feature data 816 are illustrated as being part of the computer-readable media 804 of the device 800, in other implementations some or all of the functionality of the modules 812, 814, 818 may be performed remote from the device and/or some or all of the authenticated feature data may be stored remote from the device 800. For example, the device 800 may communicate with one or more networks such that video data captured at the camera(s) 806 may be transmitted to a remote (from the device 800) location to perform any of the functionalities associated with the modules 812, 814, 818.

The modules can represent pieces of code executing on a computing device (e.g., device 104). In some examples, individual modules can include an interface, such as an Application Program Interface (API), to perform some or all of its functionality (e.g., operations). In additional and/or alternative examples, the components can be implemented as computer-readable instructions, data structures, and so forth that are executable by at least one processing unit (e.g., processor(s) 802) to configure the device 800 to perform operations including the authentication techniques described herein. Functionality to perform these operations can be implemented by a single device or distributed across multiple devices.

In at least one example, the camera(s) 806 can be any image capture device configured to capture images of a field of view. The camera(s) 806 may include one or more user facing cameras configured to capture video and output video data comprising successive digital frames of at least a portion of the field of view of the camera. For example, the digital frames may capture facial expressions and facial movements, pupil dilation and/or contraction, eye movement, or other physical features of a user.

In the example of FIG. 8, the camera(s) 806 are part of, or built into, the computing device 800. More specifically, FIG. 8 shows a non-limiting example where the computing device 800 includes a user facing camera. In other embodiments, the camera(s) 806 may be separated from, but associated with, the device 800. By way of non-limiting example, the camera(s) 806 may be separate from and communicatively coupled to the device 800. In the latter case, image data, such as the video data, can be communicated from the one or more cameras 806 to the computing device 800, for example, via a wired and/or wireless network.

The camera(s) 806 may have a fixed frame rate. For example, the camera may be configured to capture video at 30 frames per second, 60 frames per second, 120 frames per second, or some other rate. In other implementation, the frame rate may be controllable. For example, in some implementations, the camera may be adjustable, to configure the camera to capture video in one of multiple frame rates, e.g., by selecting among predetermined frame rates such as 30 frames per second, 60 frames per second, 120 frames per second, and/or some other rate. In still other embodiments, the camera may be dynamically configurable, e.g., to vary the time between consecutive captures in a video.

As described above, the computing device 800 can also include image processors 808. For instance, the computing device may include an MPEG encoder or similar hardware to process video files. In implementations described above, the MPEG encoder may compress the digital video data to determine motion vectors associated with each of the digital frames making up the video data.

The computing device 800 may also include a display 810, which by way of example and not limitation, can include a touch screen, a liquid crystal display (LCD), an organic light emitting diode (OLED) display, or the like. The display 810 may display information associated with the authentication processes described herein. For example, the display 810 may be used to convey information to a user about the authentication process, which information may include instructions for being authenticated, an indication of authentication or denial of authentication, or the like.

Based on the foregoing, it should be appreciated that although the subject matter presented herein has been described in language specific to structural components of example devices, methodological acts, computer readable media, and/or other structural components, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A computing device, comprising:
one or more processors;
a camera; and
memory storing instructions that, when executed by the one or more processors, cause the computing device to perform operations comprising:
receiving a request to authenticate a user;
acquiring, via the camera, video data comprising a plurality of frames of a subject, the plurality of frames comprising a first frame, a second frame, and a third frame, the second frame being adjacent to the first frame in the video data, the third frame being adjacent to the second frame in the video data, and a first time between capture of the first frame and capture of the second frame being different from a second time between capture of the second frame and capture of the third frame;
comparing the first frame to the second frame to determine whether the first frame substantially matches the second frame;
comparing the second frame to the third frame to determine whether the second frame substantially matches the third frame;
in response to determining that the first frame substantially matches the second frame and the second frame does not substantially match the third frame, determining that the subject is a video playback of the user; and
in response to determining that the first frame does not substantially match the second frame and the second frame does not substantially match the third frame, determining that the subject is the user.

2. The computing device of claim 1, wherein the comparing the first frame to the second frame comprises comparing first color values of one or more first pixels in the first frame with second color values of one or more second pixels in the second frame, and wherein the substantial match is determined based on a similarity of the first color values to the second color values.

3. The computing device of claim 1, further comprising a video encoder, wherein the comparing the first frame to the second frame comprises:
determining, using the video encoder, one or more motion vectors, the motion vectors indicating a motion associated with the subject between the first frame and the second frame, wherein the substantial match is determined based on the one or more motion vectors having a magnitude equal to or below a threshold magnitude.

4. The computing device of claim 1, wherein the acquiring the video data comprises acquiring a first subset of the plurality of frames at a first capture rate and acquiring a second subset of the plurality of frames at a second capture rate different from the first capture rate.

5. The computing device of claim 1, wherein the acquiring the video data comprises configuring the camera in a first configuration to acquire the second frame and configuring the camera in a second configuration to acquire the third frame.

6. A computer-implemented method comprising:
receiving a request to authenticate a user on a device;
acquiring video data at a camera associated with the device, the video data comprising a first frame, a second frame adjacent the first frame, and a third frame adjacent to the second frame, and a first time between a first capture associated with the first frame and a second capture associated with the second frame being different from a second time between the second capture and a third capture associated with the third frame;
determining that the first frame is not substantially identical to the second frame;
determining that the second frame is substantially identical to the third frame; and
denying authentication to the user based at least in part on the determining that the second frame is substantially identical to the third frame.

7. The computer-implemented method of claim 6, wherein at least one of the determining that the first frame is not substantially identical to the second frame or the determining that the second frame is substantially identical to the third frame comprises comparing first values associated with a first plurality of pixels with second values associated with a second plurality of pixels, the second plurality of pixels corresponding in number to the first plurality of pixels.

8. The computer-implemented method of claim 7, wherein the first values and the second values comprise at least one of color values or intensity values.

9. The computer-implemented method of claim 7, wherein the comparing the first values with the second values comprises calculating a correlation score indicative of the similarity of the first plurality of pixels to the second plurality of pixels, the correlation score being calculated using a correlation function.

10. The computer-implemented method of claim 6, wherein the first frame comprises a first image of a bodily feature of the user, the second frame comprises a second image of the bodily feature of the user, and the third frame comprises a third image of the bodily feature of the user, the computer-implemented method further comprising:
comparing the bodily feature with an authenticated bodily feature of the user; and
determining that the bodily feature corresponds to the authenticated bodily feature of the user.

11. The computer-implemented method of claim 6, wherein the determining that the first frame is not substantially identical to the second frame comprises:
identifying one or more features in the first frame and the one or more features in the second frame;
determining one or more transformations associated with a positional difference between the one or more features in the first frame and the one or more features in the second frame, the one or more transformations comprising at least one of an affine transformation or a projective transformation;
applying the one or more transformations to the second frame to obtain a transformed second frame; and
comparing the first frame and the transformed second frame to determine a similarity.

12. The computer-implemented method of claim 6, wherein the acquiring the video data comprises:
configuring the camera in a first configuration to capture the second frame; and
configuring the camera in a second configuration to capture the third frame.

13. The computer-implemented method of claim 6, wherein the determining that the second frame is substantially identical to the third frame comprises:
determining one or more motion vectors, the motion vectors indicative of a difference in position of one or more features from the second frame to the third frame, and
determining that the second frame is substantially identical to the third frame based on determining that the one or more motion vectors have a magnitude equal to or below a threshold magnitude.

14. A system comprising:
an electronic device;
a camera associated with the electronic device and configured to capture video of a field of view of the camera and produce video data corresponding to the video, the video data comprising a plurality of frames, the plurality of frames comprising a first frame, a second frame, and a third frame, the second frame being adjacent to the first frame in the video data and the second frame being adjacent to the third frame in the video data, and a first time between capture of the first frame and capture of the second frame being different from a second time between capture of the second frame and capture of the third frame;

a processor;

memory storing instructions that, when executed by the one or more processors, cause the system to:

receive a request to authenticate a user on the electronic device;

determine that the first frame is not a substantial duplicate of the second frame;

determine that the second frame is a substantial duplicate of the third frame; and based on the determining that the second frame is a substantial duplicate of the third frame, deny authentication of the user on the electronic device.

15. The system of claim 14, wherein the first frame includes a first image of a portion of the user, the second frame includes a second image of the portion of the user, and the third frame includes a third image of the portion of the user, and the determining that the second frame is a substantial duplicate of the third frame is indicative of the first image, the second image and the third image being images of a video on a display, the video including images of the portion of the user.

16. The system of claim 14, wherein the first frame includes a first image of a portion of the user, the second frame includes a second image of the portion of the user, and the third frame includes a third image of the portion of the user, and wherein the portion of the user is a face, a palm, a finger, or an eye of the user.

17. The system of claim 14, wherein determining whether the first frame is substantially identical to the second frame comprises comparing first values associated with a first plurality of pixels in the first frame with second values associated with a second plurality of pixels in the second frame, the second plurality of pixels corresponding in number to the first plurality of pixels.

18. The system of claim 17, wherein the first values and the second values comprise at least one of color values or intensity values.

19. The system of claim 14, wherein the instructions, when executed by the one or more processors, further cause the system to:

identify one or more features in the first frame and the one or more features in the second frame;

determine one or more transformations associated with a positional difference between the one or more features in the first frame and the one or more features in the second frame, the one or more transformations comprising at least one of an affine transformation or a projective transformation;

apply the one or more transformations to the second frame to obtain a transformed second frame; and compare the first frame and the transformed second frame to determine a similarity.

20. The system of claim 15, wherein the instructions, when executed by the one or more processors, further cause the system to:

configure the camera to capture at least one of the first frame, the second frame, or the third frame at a capture rate higher than a display rate associated with the video on the display.

21. A method comprising:

acquiring, using a camera of a device, video data representing a user, the video data comprising a first frame, a second frame adjacent the first frame, and a third frame adjacent the second frame, wherein the camera operates at a variable frame rate such that an amount of time between capture of the first frame and the second frame differs from an amount of time between capture of the second frame and the third frame;

analyzing the first frame with respect to the second frame;

analyzing the second frame with respect to the third frame to determine that the second frame is a substantial duplicate of the third frame; and denying authentication of the user.

* * * * *